(12) United States Patent
Wada et al.

(10) Patent No.: US 6,657,627 B1
(45) Date of Patent: Dec. 2, 2003

(54) VIDEO SIMULATION SYSTEM FOR CALCULATING DISTANCE BETWEEN CHARACTERS AND APPLYING POLYGON TO POLYGON PLANE

(75) Inventors: Tetsuya Wada, Kakogawa (JP); Kei Sugano, Kobe (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/020,870

(22) Filed: Feb. 9, 1998

(30) Foreign Application Priority Data

Feb. 18, 1997 (JP) .............................................. 9-034162
Feb. 18, 1997 (JP) .............................................. 9-050962

(51) Int. Cl.$^7$ .............................................. G06T 13/00
(52) U.S. Cl. .................................................... 345/473
(58) Field of Search ................................ 345/419, 473, 345/420, 427, 474, 649; 434/38; 463/37

(56) References Cited

U.S. PATENT DOCUMENTS

| 5,415,549 A | * | 5/1995 | Logg ............................ 434/38 |
| 5,616,031 A | * | 4/1997 | Logg ............................ 434/38 |
| 5,874,956 A | * | 2/1999 | LaHood ...................... 345/854 |
| 6,128,018 A | * | 10/2000 | Nakajima |

FOREIGN PATENT DOCUMENTS

| EP | 0801363 | 10/1997 |
| JP | 08036651 | 2/1996 |
| JP | 08212381 | 8/1996 |
| JP | 08241434 | 9/1996 |
| JP | 9-259303 | 10/1997 |
| WO | WO 92/16924 | 10/1992 |

OTHER PUBLICATIONS

Foley, Computer Graphics: Principles and Practice, Second Edition in C.*

* cited by examiner

Primary Examiner—Matthew C. Bella
Assistant Examiner—Huedung X. Cao
(74) Attorney, Agent, or Firm—Jordan and Hamburg LLP

(57) ABSTRACT

The distance between a moving character and a fixed character which are displayed in a pseudo-three-dimensional space on a display monitor screen is calculated by identifying one of polygons which make up the fixed character and which contains a point of planar coordinates representing the position of the moving character, and calculating the distance between the moving character and the polygon which has been identified. A polygon representing a mark associated with the moving character is applied to a plane of a polygon of the fixed character by determining a normal vector which is normal to the plane of the polygon at a predetermined position thereon, determining a first vector contained in the plane of the polygon perpendicularly to the normal vector, determining a second vector contained in the plane of the polygon perpendicularly to both the normal vector and the first vector, and determining the rotation matrix from the normal matrix, the first matrix, and the second matrix.

12 Claims, 11 Drawing Sheets

VIDEO SIMULATION SYSTEM FOR CALCULATING DISTANCE BETWEEN CHARACTERS AND APPLYING POLYGON TO POLYGON PLANE

BACKGROUND OF THE INVENTION

1. Field of the Invention:

The present invention relates to a video simulation system, and more particularly to a method of and an apparatus for calculating the distance between characters displayed in a pseudo-three-dimensional space on a display monitor screen, a method of and an apparatus for applying a polygon to the plane of a polygon displayed in a pseudo-three-dimensional space on a display monitor screen, and a video simulator which incorporates such an apparatus.

2. Description of the Prior Art:

Various game apparatus which are capable of displaying a plurality of characters in a pseudo-three-dimensional space on a display monitor screen have been in widespread usage in recent years. In order to make video games played on such game apparatus attractive to game players, the game apparatus are required to have, among various functions, an ability to decide whether different displayed characters hit each other, e.g., whether a moving character such as a flight object flying in air contacts or hits a fixed character such as a mountain or ground. Heretofore, it has been customary to decide a character-to-character hit by roughly comparing the image data of a moving character and the image data of a fixed character with each other.

Recent years have seen requirements for higher-speed data processing and higher-resolution image display in game apparatus. To meet such requirements, recent game apparatus are capable of clearly displaying moving and fixed characters as they move closely to each other. The conventional rough data comparison process, however, is unable to keep up with the ability of the recent game apparatus to clearly display moving and fixed characters. Specifically, the rough data comparison process may decide that a moving character hits a fixed character though the moving character does not in fact contact or hit the fixed character, or, conversely, may decide that a moving character does not hit a fixed character though the moving character actually contacts or hits the fixed character. When such a wrong decision is made, the game player feels puzzled or embarrassed as the decision obviously differs from what is displayed on the display monitor screen.

Some simulation game apparatus capable of displaying a plurality of characters in a pseudo-three-dimensional space on a display monitor screen are equipped with structures which simulate a car, a ski, a surfboard, a motorboat, etc. Those simulation game apparatus which simulate a car or a motorboat have a driver's seat, a steering wheel, an accelerator pedal, and a brake pedal among others. Those simulation game apparatus which simulate a ski have boards for placing feet thereon and two sticks, and those simulation game apparatus which simulate a surfboard have boards for placing feet thereon. Game players who play video games on the simulation game apparatus operate those structural members to manipulate a character displayed on the display monitor screen in order to, e.g., pass a competitor in a foreground displayed on the display monitor screen and avoid obstacles (including cars or boats controlled by a computer) displayed on the display monitor screen.

Another simulation game apparatus, which has been proposed to arose a greater interest of game players than the above simulation game apparatus, displays a flight object in a pseudo-three-dimensional space on the display monitor screen and allows the game player to control the displayed flight object to fly in the pseudo-three-dimensional space. This simulation game apparatus can be made more attractive to game players if a shadow of the flight object is projected onto another displayed object such as a displayed land.

The problems and demands described above are applicable to simulators which include simulation game apparatus.

SUMMARY OF THE INVENTION

It is an object of the present invention to provide a method of calculating the distance between a moving character and a fixed character which are displayed in a pseudo-three-dimensional space on a display monitor screen for thereby accurately deciding whether the moving character hits the fixed character or not.

Another object of the present invention to provide an apparatus for calculating the distance between a moving character and a fixed character which are displayed in a pseudo-three-dimensional space on a display monitor screen for thereby accurately deciding whether the moving character hits the fixed character or not.

Still another object of the present invention to provide a simulator which incorporate such a distance calculating apparatus.

A further object of the present invention to provide a method of applying polygons representative of a shadow of a flight object, for example, to polygons representative of a character such as a terrain shape.

A still further object of the present invention to provide an apparatus for applying polygons representative of a shadow of a flight object, for example, to polygons representative of a character such as a terrain shape.

A yet still further object of the present invention to provide a simulator which incorporates such a polygon applying apparatus.

According to an aspect of the present invention, there is provided a method of calculating a distance between a moving character displayed in a pseudo-three-dimensional space on a display monitor screen and a fixed character composed of a plurality of polygons displayed in the pseudo-three-dimensional space on the display monitor screen. The method comprises the steps of identifying a polygon containing a point of planar coordinates representing the position of the moving character, and calculating a distance between the moving character and the polygon which has been identified. In the first step, a polygon containing a point of planar coordinates representing the position of the moving character is identified. In the second step, a distance between the moving character and the polygon which has been identified is calculated.

The polygon is of a triangular shape, and a polygon is identified which satisfies the conditions of $s \geq 0$, $t \geq 0$, and $s+t \geq 1$ in the equation: $p=(s \times a)+(t \times b)$ where p represents a vector directed from a reference vertex of the polygon toward the point of planar coordinates contained in the polygon, a, b represent respective vectors directed from the reference vertex of the polygon toward respective other vertexes of the polygon, and s, t represent respective coefficients of the vectors a, b.

In the second step, a distance y between the moving character and the polygon which has been identified is calculated according to the equation:

$$y=n_x(P_x-O_x)+n_y(P_y-O_y)+n_z(P_z-O_z)$$

where $n_x$, $n_y$, $n_z$ represents components respectively along X-, Y-, and Z-axes of a vector n normal to the polygon, $P_x$, $P_y$, $P_z$ represent coordinates respectively along the X-, Y-, and Z-axes of the position of the moving character, and $O_x$, $O_y$, $O_z$ represent coordinates respectively along the X-, Y-, and Z-axes of a predetermined point O on a plane which contains the polygon. The predetermined point O comprises a reference vertex of the polygon.

The fixed character comprises a plurality of blocks arranged in vertical and horizontal arrays, each of the blocks comprising a plurality of polygons. Prior to the step of identifying a polygon, one of the blocks which confronts the moving character is identified.

According to another aspect of the present invention, there is provided an apparatus for calculating a distance between a moving character displayed in a pseudo-three-dimensional space on a display monitor screen and a fixed character composed of a plurality of polygons displayed in the pseudo-three-dimensional space on the display monitor screen. The apparatus comprises first means for identifying a polygon containing a point of planar coordinates representing the position of the moving character, and second means for calculating a distance between the moving character and the polygon which has been identified by the first means. The first means identifies a polygon containing a point of planar coordinates representing the position of the moving character. The second means calculates a distance between the moving character and the polygon which has been identified by the first means.

The polygon is of a triangular shape. The first means identifies a polygon which satisfies the conditions of $s \geq 0$, $t \geq 0$, and $s+t \geq 1$ in the equation: $p=(s \times a)+(t \times b)$ where p represents a vector directed from a reference vertex of the polygon toward the point of planar coordinates contained in the polygon, a, b represent respective vectors directed from the reference vertex of the polygon toward respective other vertexes of the polygon, and s, t represent respective coefficients of the vectors a, b. The second means calculates a distance y between the moving character and the polygon which has been identified, according to the equation:

$$y=n_x(P_x-O_x)+n_y(P_y-O_y)+n_z(P_z-O_z)$$

where $n_x$, $n_y$, $n_z$ represent components respectively along X-, Y-, and Z-axes of a vector n normal to the polygon, $P_x$, $P_y$, $P_z$ represent coordinates respectively along the X-, Y-, and Z-axes of the position of the moving character, and $O_x$, $O_y$, $o_z$ represent coordinates respectively along the X-, Y-, and Z-axes of a predetermined point O on a plane which contains the polygon.

According to still another aspect of the present invention, there is provided a simulator comprising a display monitor for displaying a moving character and a fixed character in a pseudo-three-dimensional space on a display monitor screen, a control device manipulatable by a player, detecting means for detecting a control action produced by the control device, calculating means for calculating a position on the display monitor screen of the moving character based on a detected signal from the detecting means, and an apparatus for calculating a distance between the moving character and the fixed character. The apparatus comprises first means for identifying a polygon containing a point of planar coordinates representing the position of the moving character calculated by the calculating means, and second means for calculating a distance between the moving character and the polygon which has been identified by the first means. The display monitor displays a moving character and a fixed character in the pseudo-three-dimensional space on the display monitor screen. The calculating means calculates a position on the display monitor screen of the moving character based on a detected signal from the detecting means. The first means identifies a polygon containing a point of planar coordinates representing the position of the moving character calculated by the calculating means, and the second means calculates a distance between the moving character and the polygon which has been identified by the first means.

The moving character comprises a flight object, and the control unit varies a height of the flight object in the pseudo-three-dimensional space on the display monitor screen.

According to yet still another aspect of the present invention, there is provided a method of calculating a distance between a character movably displayed in a pseudo-three-dimensional space on a display monitor screen and a polygon model composed of a plurality of polygons displayed in the pseudo-three-dimensional space on the display monitor screen. The method comprises the steps of establishing a hypothetical plane in the pseudo-three-dimensional space and identifying one of the polygons which is positioned on the periphery of or within a polygonal shape onto which the character is projected when the character and the polygons of the polygon model are projected onto the hypothetical plane, and calculating a distance between the identified one of the polygons and the character. A hypothetical plane is established in the pseudo-three-dimensional space and one of the polygons which is positioned on the periphery of or within a polygon shape onto which the character is projected is identified when the character and the polygons of the polygon model are projected onto the hypothetical plane. A distance between the identified one of the polygons and the character is calculated.

According to a further aspect of the present invention, there is provided an apparatus for calculating a distance between a character movably displayed in a pseudo-three-dimensional space on a display monitor screen and a polygon model composed of a plurality of polygons displayed in the pseudo-three-dimensional space on the display monitor screen. The apparatus comprises polygon identifying means for establishing a hypothetical plane in the pseudo-three-dimensional space and identifying one of the polygons which is positioned on the periphery of or within a polygonal shape onto which the character is projected when the character and the polygons of the polygon model are projected onto the hypothetical plane, and distance calculating means for calculating a distance between the one of the polygons which has been identified by the polygon identifying means and the character. The polygon identifying means establishes a hypothetical plane in the pseudo-three-dimensional space and identifies one of the polygons which is positioned on the periphery of or within a polygonal shape onto which the character is projected when the character and the polygons of the polygon model are projected onto the hypothetical plane. The distance calculating means calculates a distance between the one of the polygons which has been identified by the polygon identifying means and the character.

According to a still further aspect of the present invention, there is provided a simulator comprising a display monitor visually observable by a player, display control means for displaying on the display monitor a character movably in a pseudo-three-dimensional space and a polygon model composed of a plurality of polygons in the pseudo-three-dimensional space, as viewed from a predetermined viewpoint, a control device manipulatable by the player, detecting means for detecting a control action produced by the control device, calculating means for calculating a position on the display monitor screen of the moving character based on a detected signal from the detecting means, and an apparatus for calculating a distance between the character and the polygon model. The apparatus comprises polygon identifying means for establishing a hypothetical plane in the pseudo-three-dimensional space and identifying one of the polygons which is positioned on the periphery of or within a polygonal shape onto which the character is projected when the character and the polygons of the polygon model are projected onto the hypothetical plane, distance calculating means for calculating a distance between the one of the polygons which has been identified by the polygon identifying means and the character, and contact decision means for deciding whether the character and the polygon model has contacted each other based on the distance calculated by the distance calculating means. The polygon identifying means establishes a hypothetical plane in the pseudo-three-dimensional space and identifying one of the polygons which is positioned on the periphery of or within a polygonal shape onto which the character is projected when the character and the polygons of the polygon model and projected onto the hypothetical plane. The distance calculating means calculates a distance between the one of the polygons which has been identified by the polygon identifying means and the character. The contact decision means decides whether the character and the polygon model has contacted each other based on the distance calculated by the distance calculating means.

The display control means displays a contact-indicating image on the display monitor when the character and the polygon model has contacted each other as decided by the contact decision means.

According to a yet still further aspect of the present invention, there is provided a method of applying a polygon which represents a mark to a plane of a polygon which represents a character displayed in a pseudo-three-dimensional space on a display monitor screen, using a rotation matrix. The method comprises the steps of determining a normal vector within is normal to the plane of the polygon at a predetermined position thereon, determining a first vector contained in the plane of the polygon perpendicularly to the normal vector, determining a second vector contained in the plane of the polygon perpendicularly to both the normal vector and the first vector, and determining the rotation matrix from the normal matrix, the first matrix, and the second matrix. A normal vector which is normal to the plane of the polygon at a predetermined position thereon is determined. Then, a first vector contained in the plane of the polygon perpendicularly to the normal vector is determined, and a second vector contained in the plane of the polygon perpendicularly to both the normal vector and the first vector is determined. Finally, the rotation matrix is determined from the normal matrix, the first matrix, and the second matrix.

In the step of determining a first vector, a first vector $(X_x, X_y, X_z)$ is determined as:

$$X_x = B_x - A_x,$$

$$X_y = B_y - A_y,$$

$$X_z = B_z - A_z$$

where $(A_x, A_y, A_z)$, $(B_x, B_y, B_z)$ represent two arbitrary points, respectively, on the plane of the polygon.

The two arbitrary points comprise two arbitrary vertexes, respectively, of the polygon.

In the step of determining a second vector, a second vector $(Z_x, Z_y, Z_z)$ is determined as:

$$Z_x = X_y \times n_z - X_z \times n_y,$$

$$Z_y = X_z \times n_x - X_x \times n_z,$$

$$Z_z = X_x \times n_y - X_y \times n_x$$

where $X_x$, $X_y$, $X_z$ represent the first vector, and $n_x$, $n_y$, $n_z$ represent the normal vector.

The rotation matrix is determined as:

$$\begin{bmatrix} X_x & n_x & Z_x \\ X_y & n_y & Z_y \\ X_z & n_z & Z_z \end{bmatrix}$$

The character comprises a fixed character, and a moving character is displayed in the pseudo-three-dimensional space. The mark is associated with the moving character. For example, the mark comprises a shadow of the moving character.

The polygon comprises one of a plurality of polygons which make up the fixed character, and contains a point of planar coordinates representing the position of the moving character. Prior to determining the normal vector, the polygon is identified.

According to another aspect of the present invention, there is provided an apparatus for applying a polygon which represents a mark to a plane of a polygon which represents a character displayed in a pseudo-three-dimensional space on a display monitor screen, using a rotation matrix. The apparatus comprises first means for determining a normal vector which is normal to the plane of the polygon at a predetermined position thereon, second means for determining a first vector contained in the plane of the polygon perpendicularly to the normal vector, third means for determining a second vector contained in the plane of the polygon perpendicularly to both the normal vector and the first vector, and fourth means for determining the rotation matrix from the normal matrix, the first matrix, and the second matrix. The first means determines a normal vector which is normal to the plane of the polygon at a predetermined position thereon. The second means determines a first vector contained in the plane of the polygon perpendicularly to the normal vector. The third means determines a second vector contained in the plane of the polygon perpendicularly to both the normal vector and the first vector. The fourth means determines the rotation matrix from the normal matrix, the first matrix, and the second matrix. The character comprises a fixed character, and the apparatus further comprises means for displaying a moving character in the pseudo-three-dimensional space. The mark is associated with the moving character.

According to still another aspect of the present invention, there is provided a simulator comprising a display monitor for displaying a moving character and a fixed character in a pseudo-three-dimensional space on a display monitor screen, a control device manipulatable by a player, detecting means for detecting a control action produced by the control device, calculating means for calculating a position on the display monitor screen of the moving character based on a detected signal from the detecting means, and an apparatus for applying a polygon to a plane of a polygon which represents the fixed character, using a rotation matrix. The apparatus comprises first means for determining a normal vector which is normal to the plane of the polygon at a predetermined position thereon, second means for determining a first vector contained in the plane of the polygon perpendicularly to the normal vector, third means for determining a second vector contained in the plane of the polygon perpendicularly to both the normal vector and the first vector, and fourth means for determining the rotation matrix from the normal matrix, the first matrix, and the second matrix. The first means determines a normal vector which is normal to the plane of the polygon at a predetermined position thereon. The second means determines a first vector contained in the plane of the polygon perpendicularly to the normal vector. The third means determines a second vector contained in the plane of the polygon perpendicularly to both the normal vector and the first vector. The fourth means determines the rotation matrix from the normal matrix, the first matrix, and the second matrix. The moving character comprises a flight object, and the polygon applied to the plane of the polygon comprises a shadow associated with the flight object.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
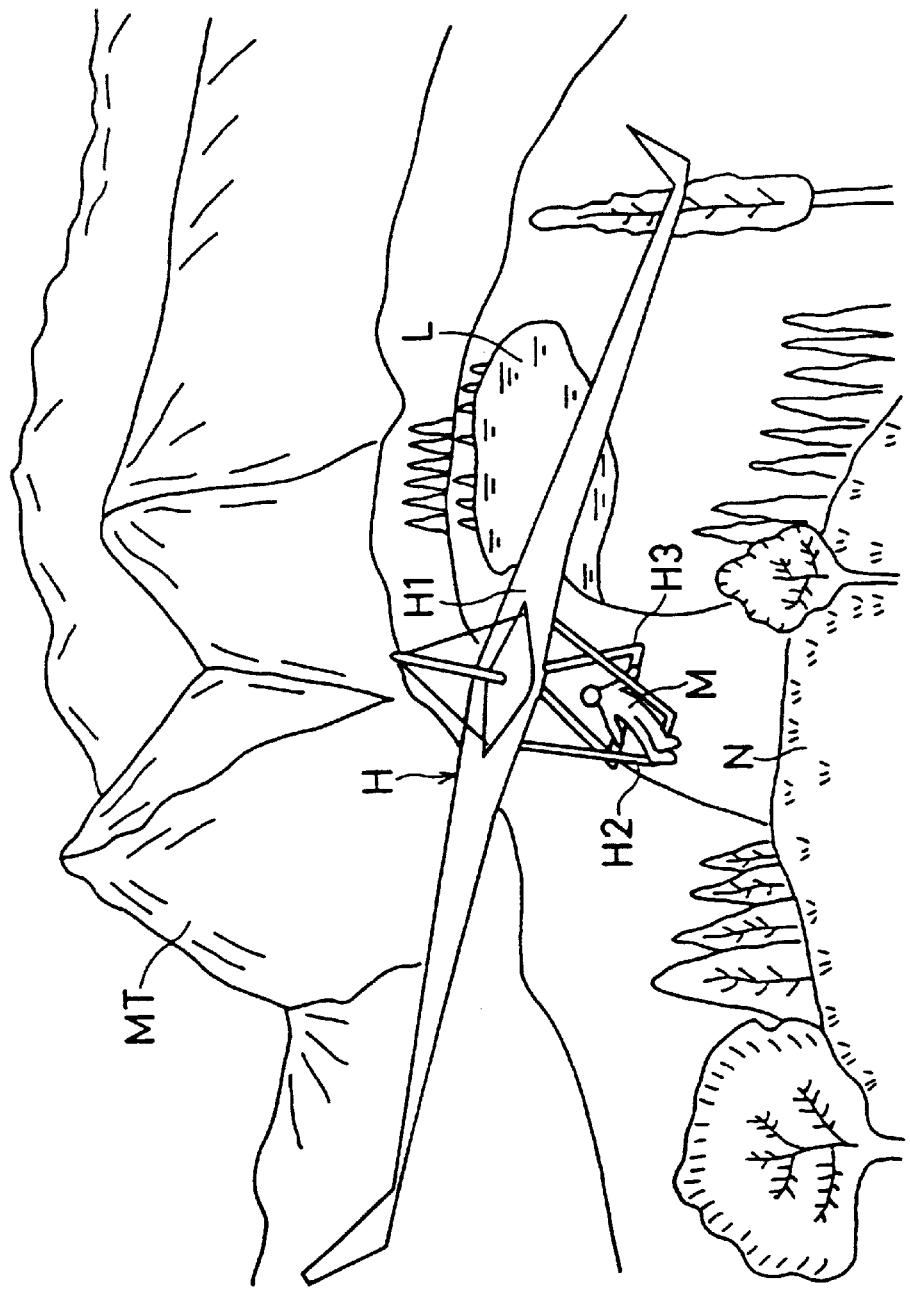
FIG. 1 is a schematic perspective view showing a flight simulation image displayed in a pseudo-three-dimensional space on a display monitor screen in a flight simulation video game which is played on a flight simulation game apparatus which incorporates the principles of the present invention.

As shown in FIG. 1, a flight simulation game apparatus 1 (see FIG. 3) which incorporates the principles of the present invention simulates a hang glider H as a flight vehicle to enable a game player to experience physical sensations of flight in midair in a flight simulation video game. The hang glider H is in the shape of an isosceles triangle as viewed in plan, and has a lightweight metal frame and a triangular wing H1 of cloth which is attached to the lightweight metal frame.

The hand glider H also has a hanger H2 for supporting a pilot M, the hanger H2 being connected to an extending downwardly from a central portion of the lightweight metal frame. The hang glider H further includes a horizontal control lever H3 connected to and extending downwardly from a front portion of the lightweight metal frame. The pilot M suspended by the hanger H2 moves the control lever H3 horizontally in one direction or the other to turn the hand glider H to the left or right. The pilot M can also change the direction of the hang glider H or lift or lower the hang glider H by shifting the body weight through the hanger H2.

As shown in FIG. 1, an actual flight environment includes an updraft zone, a downdraft zone, and a turbulence zone. The hang glider H in flight is lifted when it enters the updraft zone and lowered when it enters the downdraft zone, and becomes unstable when it enters the turbulence zone. While in flight in the flight environment, the pilot M controls the control lever H3 to fly over a plain N and a lake L, avoid a mountain MT, and maneuver the hang glider H in the turbulence zone with flying techniques for thereby enjoying soaring experiences.

The flight simulation game apparatus 1 enable the game player to experience and enjoy the simulated flight of the hang glider H in pseudo-three-dimensional space on a display monitor screen. The flight simulation game apparatus 1 is arranged to hold the game player in an attitude which simulates the suspended position of the pilot M on the hanger H2, and also to display pseudo-three-dimensional images of forward and downward scenes as shown in FIG. 1. The displayed pseudo-three-dimensional images change as the game player make control actions in a manner similar to actual control actions, so that the game player can gain simulated visual flight experience similar to actual visual flight experiences.

Figure 2:
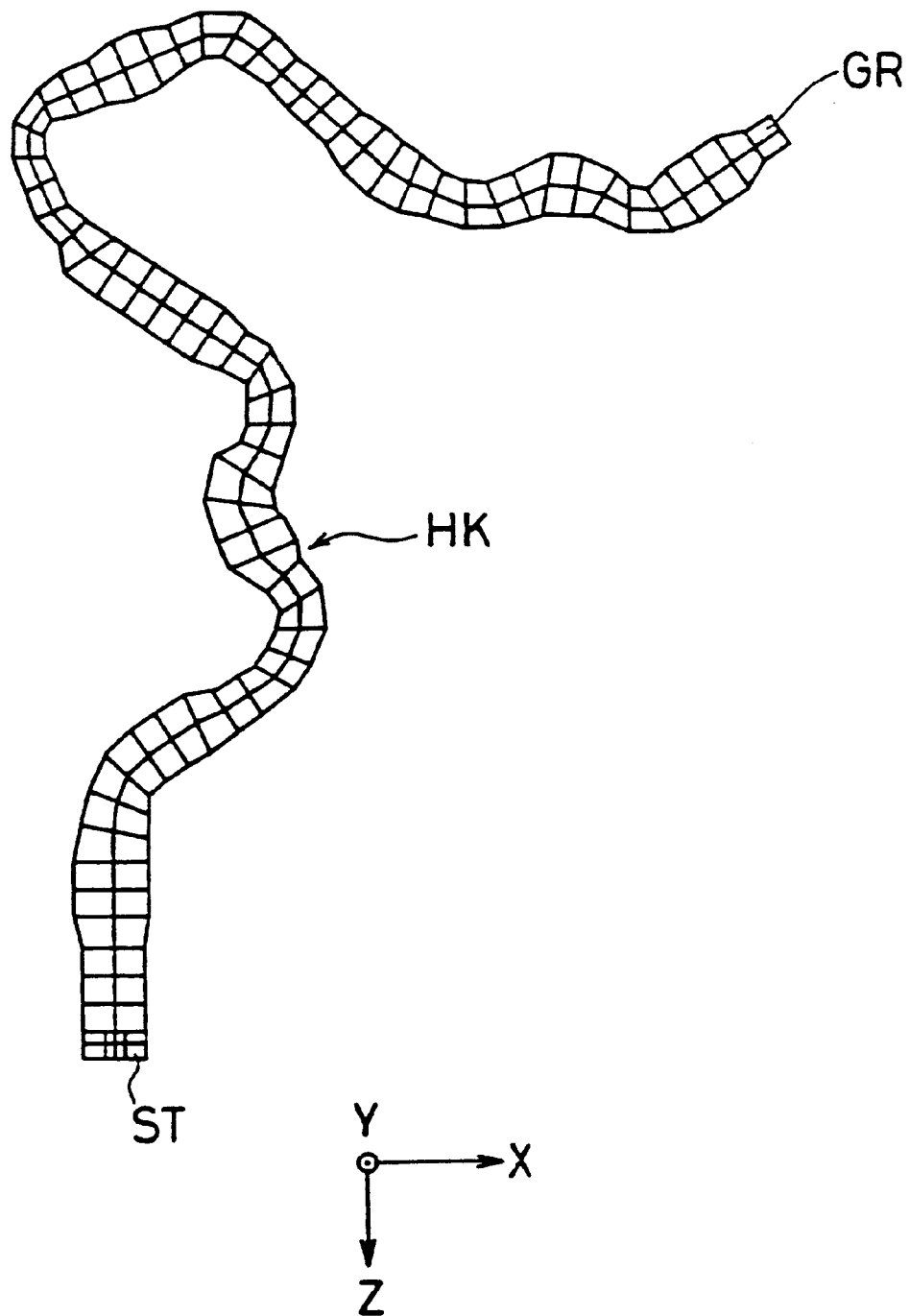
FIG. 2 is a diagram showing a flight route of a hang glider simulated by the flight simulation game apparatus.

In the flight simulation game apparatus 1, as shown in FIG. 2, the game player is supposed to fly the hang glider H from a start point ST to a goal point GR along a flight route HK that is formed necessarily due to the presence of nearby mountains and forests. The flight route HK is divided into a plurality of successive parts or zones shown in FIG. 2. While the flight simulation video game is in progress, the part or zone in which the hang glider H is currently flying is detected or supervised, and a pseudo-three-dimensional image corresponding to the detected or supervised part or zone is displayed on the display monitor screen.

Figure 3:
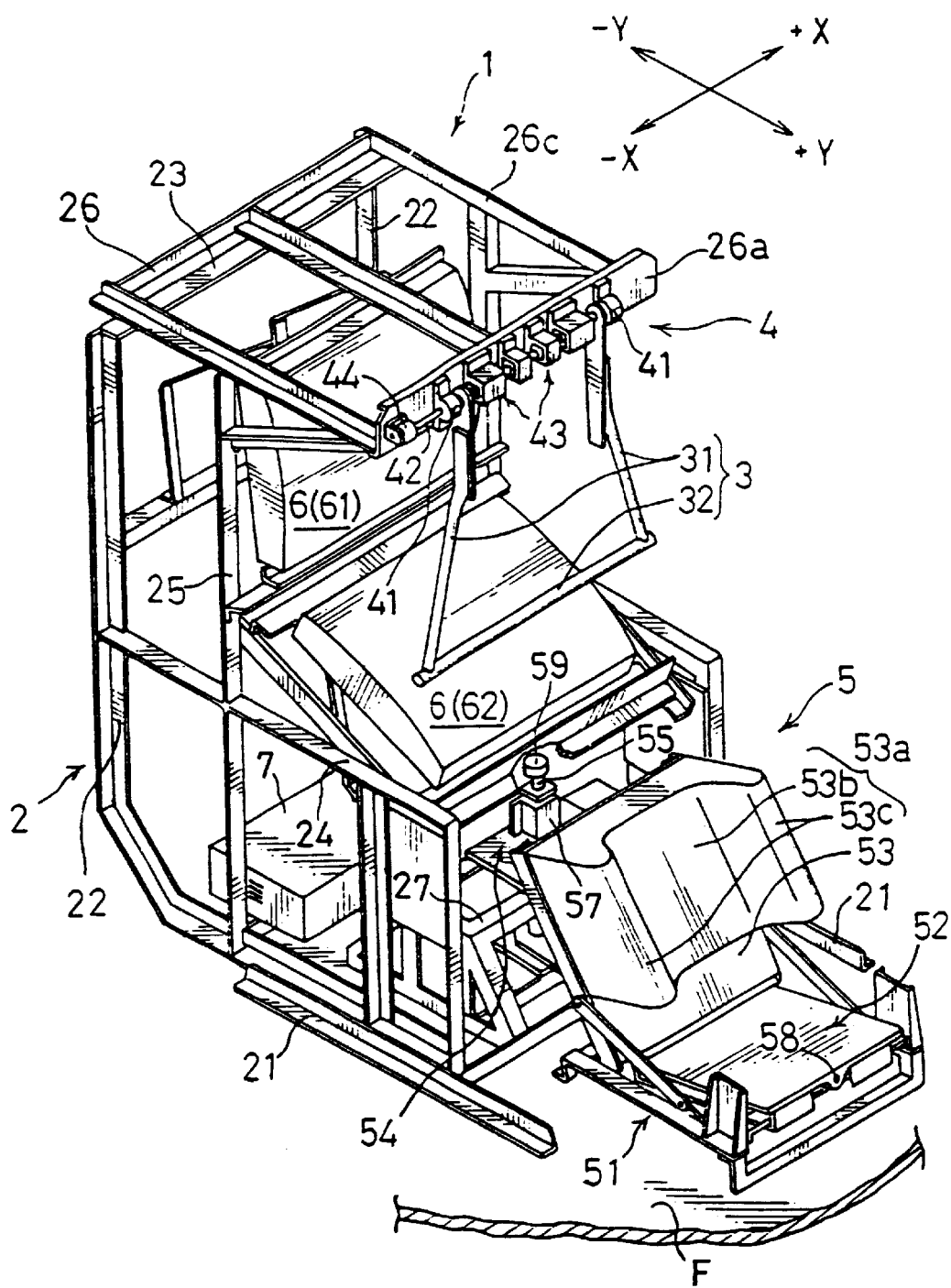
FIG. 3 is a perspective view of an internal structure of the flight simulation game apparatus.

FIG. 3 shows an internal structure of the flight simulation game apparatus 1, which incorporates the principles of the present invention. Principal directions with respect to the internal structure of the flight simulation game apparatus 1 will hereinafter be referred to as transverse directions indicated by the arrows +X, –X and longitudinal directions indicated by the arrows +Y, –Y in FIG. 2. Particularly, the direction indicated by the arrow –X will be referred to as a leftward direction, the direction indicated by the arrow +X as a rightward direction, the direction indicated by the arrow –Y as a forward direction, and the direction indicated by the arrow +Y as a backward direction.

The flight simulation game apparatus 1 comprises a framework 2 made up of a three-dimensional assembly of angles, a control lever 3 mounted on a rear end of an upper portion of the framework 2, a control lever moving mechanism 4 on which the control lever 3 is supported for movement in the longitudinal directions, a body holder 5 for holding the legs of a game player, the body holder 5 being positioned on a rear end of a lower portion of the framework 2, a display monitor 6 for displaying images of simulated scenes while in flight, and a control system 7 for scrolling displayed images on the display monitor 6.

The framework 2 has a pair of transversely spaced base frames 21 installed in a floor F and a pair of transversely spaced L-shaped frames 22 supported respectively on the base frames 21. The L-shaped frames 22 have respective upper ends interconnected by an upper front horizontal bar 23, and hence are stably held in their upstanding position by the upper front horizontal bar 23.

The L-shaped frames 22 are connected to a pair of transversely spaced intermediate frames 24, respectively, positioned behind upstanding portions of the L-shaped frames 22. The intermediate frames 24 are joined to respective transversely spaced upstanding frames 25 positioned slightly forwardly of longitudinally intermediate portions of the L-shaped frames 22.

The upstanding frames 25 have respective upper ends positioned at substantially the same height as the upper front horizontal bar 23. The upper ends of the upstanding frames 25 and the upper front horizontal bar 23 support thereon a substantially square frame 26. The control lever 3, the control lever moving mechanism 4, the body holder 5, the display monitor 6, and the control system 7 are supported on the framework 2 of the above structure as described in detail below.

The control lever 3 is attached to a control lever support plate 26b of the frame 26 through the control lever moving mechanism 4 for movement in the longitudinal directions. The control lever 3 is basically of a U shape that slightly spreads downwardly as viewed in the forward direction −Y from the body holder 5. Specifically, the control lever 3 comprises a pair of transversely spaced vertical rods 31 extending downwardly from opposite sides of the control lever moving mechanism 4 and progressively spreading away from each other, and a horizontal grip rod 32 extending between and connected to lower ends of the vertical rods 31. The game player grips the grip rod 32 with both hands and moves the grip rod 32 in the longitudinal directions −Y, +Y to make control actions for playing the flight simulation game.

The control lever moving mechanism 4 comprises a pair of transversely spaced bearings 41 mounted on the control lever support plate 26b, a horizontal shaft 42 rotatably supported by the bearings 41 for angular movement about its own axis, a plurality of biasing structures 43 mounted on the control lever support plate 26b and spaced along the horizontal shaft 42 between the bearings 41, for imparting resistive or biasing forces to the horizontal shaft 42 against angular movement thereof, and an angular displacement sensor 44 such as a rheostat, a potentiometer, or the like mounted on the control lever support plate 26b and connected coaxially to a left end of the horizontal shaft 42 for detecting an angular displacement of the horizontal shaft 42. The vertical rods 31 of the control lever 3 have respective upper ends fixed to the horizontal shaft 42 near the respective bearings 41 so that the horizontal shaft 42 can be angularly moved about its own axis when the control lever 3 is moved in the longitudinal directions −Y, +Y by the game player.

The body holder 5 comprises a body holder frame 51, a leg rest 52 and a thigh support 53 which are mounted on the body holder frame 51, and a body holder moving mechanism 54 for moving the body holder frame 51 in the transverse directions −X, +X. The body holder frame 51 is of a rectangular shape as viewed in plan, and is positioned behind the lower portion of the framework 2 and has its bottom spaced upwardly from the floor F. The leg rest 52 is in the form of a flat plate disposed on a rear portion of the body holder frame 51 and has its general plane inclined at a small angle downwardly in the forward direction −Y. The thigh support 53 is positioned in front of the leg rest 52 and inclined upwardly in the forward direction −Y. The angle at which the leg rest 52 is inclined to the horizontal plane is selected such that the game player on the body holder 5 has its body tilted forwardly, and the angle at which the thigh support 53 is inclined to the horizontal plane is selected such that the forwardly tilted body of the game player can be borne by the legs of the game player on the leg rest 52.

The thigh support 53 has a rear surface supporting thereon a pad 53a made of a soft material such as cellular plastic or the like. The pad 53a has a central vertical valley or trough 53b and a pair of side ridges 53c disposed one on each side of the central vertical trough 53b. When the game player is positioned on the body holder 5 with the legs placed on the leg rest 52, the thighs are fitted in the central vertical trough 53b between the side ridges 53c.

The body holder moving mechanism 54 is supported on an inner frame 27 disposed in a front region of the lower portion of the framework 2. The body holder moving mechanism 54 comprises a vertical shaft 55 rotatably supported on the inner frame 27 for angular movement about its own axis and a biasing structure 57 mounted on the vertical shaft 55 for imparting resistive or biasing forces to vertical shaft 55 against angular movement thereof. An angular displacement sensor 59 such as a rheostat, a potentiometer, or the like is fixed coaxially to an upper end of the vertical shaft 55 for detecting an angular displacement of the vertical shaft 55 and hence the leg rest 52. Two transversely spaced helical springs (not shown) are disposed underneath the leg rest 52 for exerting resilient biasing forces to normally keep the leg rest 52 in a horizontal attitude. When the game player places more body weight on one of the legs on the leg rest 52, the leg rest 52 is tilted from the horizontal attitude, depressing its portion under the weighted leg.

The display monitor 6 comprises a front monitor unit 61 positioned in front of the control lever 3 between the upstanding frames 25 and a lower monitor unit 62 positioned below the control lever 3 and the front monitor unit 61 and between the intermediate frames 24. The front monitor unit 61 has a monitor screen facing rearwardly and lying substantially vertically. The lower monitor unit 62 has a monitor screen facing upwardly and inclined upwardly in the forward direction −Y. When the game player who has the legs placed the leg rest 52, the thighs on the thigh support 53, and the hands gripping the grip rod 32 directs the line of sight forwardly, the game player can view the monitor screen of the front monitor unit 61. When the game player directs the light of sight downwardly, the game player can view the monitor screen of the lower monitor unit 62.

The control system 7 is positioned in a space that is defined in the rear end of the lower portion of the framework 2. The control system 7 will be described in detail below with reference to FIG. 4. The control system 7 shown in FIG. 4 serves to control images displayed on the display monitor units 61, 62. Basically, the control system 7 controls the displayed images based on angular movement of the control lever 3 about the horizontal shaft 42 and the angular movement of the leg rest 52 and the thigh support 53 about the vertical shaft 55.

Figure 4:
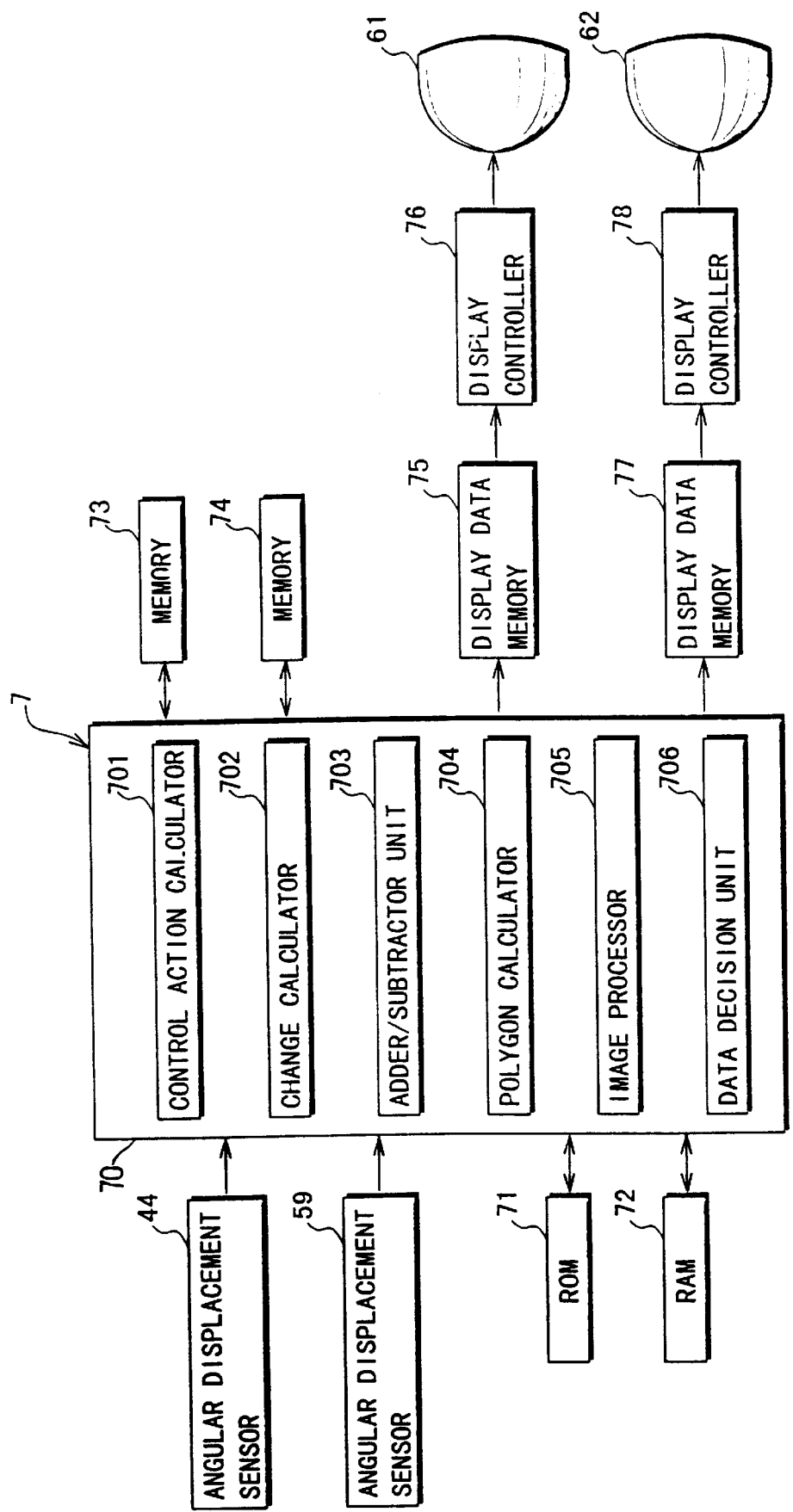
FIG. 4 is a block diagram of a control system of the flight simulation game apparatus.

As shown in FIG. 4, the control system 7 has a CPU (central processing unit) 70, a ROM 71 which stores a control program for controlling the display of images on the display monitor 6, and a RAM 72 connected to the microcomputer 70 for temporarily storing processed data. The control system 7 displays pseudo-three-dimensional images on the display monitor units 61, 62 depending on detected signals from the angular displacement sensors 44, 59. The control system 7 also has memories 73, 74 such as magnetic disks, optical disks, ROMs, or the like for storing data representing simulated front and lower scenes to be displayed on the front and lower monitor units 61, 62. These simulated front and lower scenes may include, for example, scenes of mountains and surrounding regions in wide horizontal ranges as viewed horizontally from a spot (mountain top or the like) where the simulated hang glider has taken off in a simulated flight session and also horizontally from the viewpoint of the game player in simulated flight.

Figure 5:
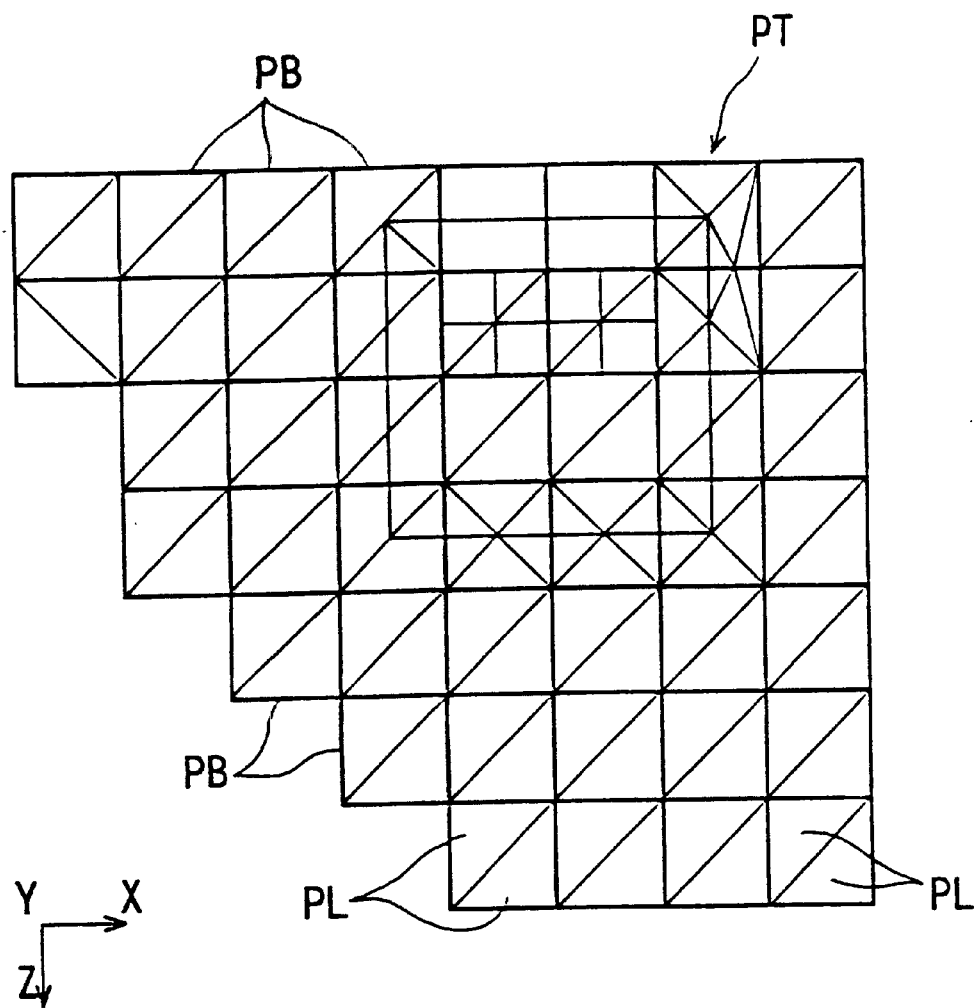
FIG. 5 is a plan view of a displayed polygonal terrain shape.
Figure 6:
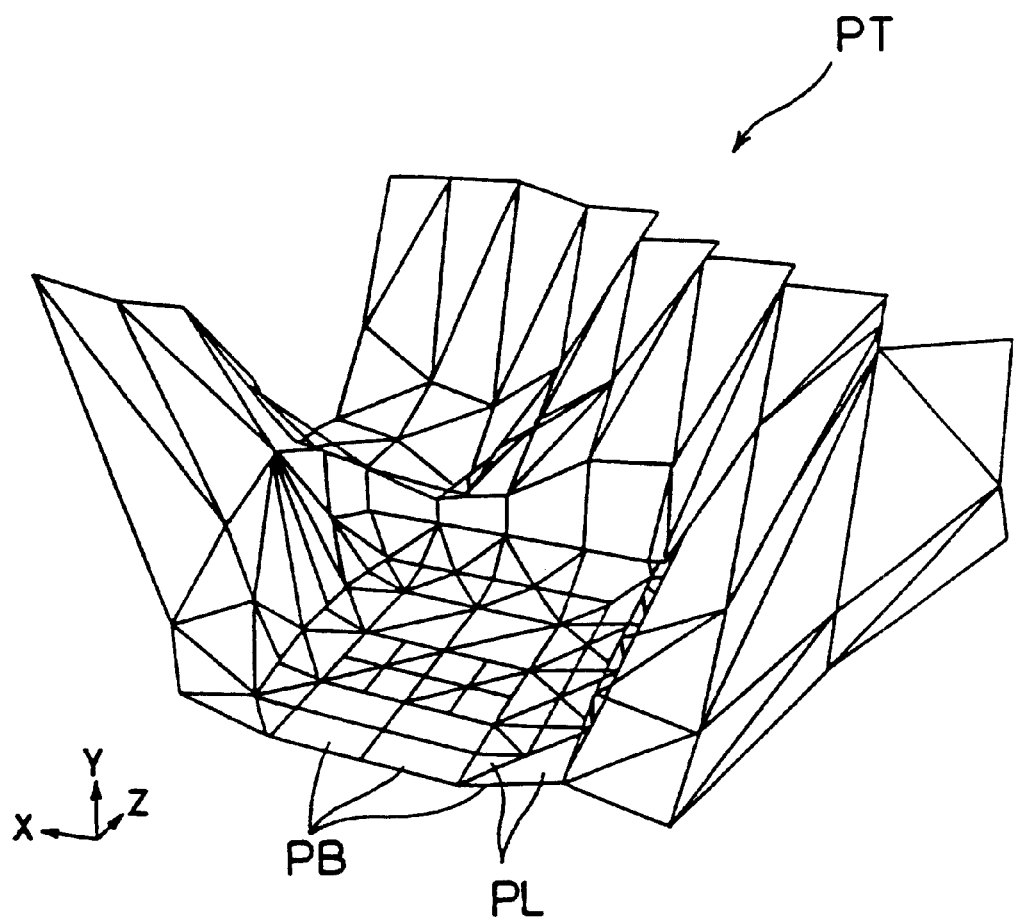
FIG. 6 is a perspective view of the displayed polygonal terrain shape.

Among the simulated scenes are fixed characters which include a polygonal terrain shape PT as shown in FIGS. 5 and 6. The polygonal terrain shape PT contains a mountain from which the hang glider has started to fly, other mountains, and grounds. The memories 73, 74 store associated image data of the coordinates of vertexes of polygons divided from fixed characters that serve as obstacles to the hang glider and textures to be applied to the polygons. The coordinates are given as coordinates along X-, Y-, and Z-axes of a three-dimensional coordinate system. FIG. 5 shows the polygonal terrain shape PT in plan, and FIG. 6 shows the polygonal terrain shape PT in perspective. The polygonal terrain shape PT comprises a plurality of blocks (font) PB arranged in vertical and horizontal arrays. Each of the blocks PB, which comprises a plurality of triangular polygons PL, is in the shape of a square having sides each of a length corresponding to 4096 pixels (X- or Z-axis coordinates).

The memory 73 additionally stores associated image data of the coordinates of vertexes of polygons of the hang glider which serves as a moving character and textures to be applied to the polygons. The CPU 70 reads image data of the hang glider as operated by the game player from the memory 73, and displays an image of the hang glider, as viewed from a viewpoint immediately behind the hang glider, on the front monitor unit 61. The hang glider can be operated by the game player to fly along a valley contained in the polygonal terrain shape PT shown in FIGS. 5 and 6 without contacting or hitting a mountainside or ground.

The CPU 70 functionally has a means for calculating a present viewpoint and a present line of sight of the game player based on a detected voltage from the angular displacement sensor 44, which represents an operated angular displacement of the control lever 3, and a detected voltage from the angular displacement sensor 59, which represents an operated angular displacement of the leg rest 52 of the body holder 5. Specifically, the CPU 70 comprises as functional blocks a control action calculator 701 for calculating voltage differences, as control actions of the control lever 3 and the body holder 5, between reference voltages that are detected from the angular displacement sensors 44, 59 when the control lever 3 is in a reference position in a vertical plane and the body holder 5 is in a reference position parallel to the longitudinal directions −Y, +Y, and present voltages that are detected from the angular displacement sensors 44, 59 when the control lever 3 is angularly moved about the horizontal shaft 42 and the body holder 5 is angularly moved about the vertical shaft 55, a change calculator 702 for calculating changes of the viewpoint and line of sight of the game player from the previously calculated viewpoint and line of sight based on the control actions calculated by the control action calculator 701, and an adder/subtractor unit 703 for adding the calculated changes to or subtracting the calculated changes from the previously calculated viewpoint and light of sight. The CPU 70 effects the functions of the control action calculator 701, the change calculator 702, and the adder/subtractor unit 703 in every 1/60 second for thereby successively calculating the viewpoint and line of sight. The viewpoint corresponds to the height of the game player in the simulated flight, and the line of sight corresponds to the present direction of the game player in the simulated flight relative to the direction in which the simulated hang glider has taken off in the present simulated flight session.

The CPU 70 also includes a polygon calculator 704 for calculating data of displayed positions, sizes, and angular displacements of polygons to be displayed on the display monitor units 61, 62 based on the data of the calculated viewpoint and line of sight, and an image processor 705 for mapping the calculated data onto polygons read from the memories 73, 74, applying textures from the memories 73, 74 to the polygons, and supplying the polygon data together with shade data to display data memories 75, 77. The CPU 70 further includes a data decision unit 706 for deciding whether the displayed hang glider has contacted or hit an obstacle or not based on the positions of displayed positions which are calculated by the polygon calculator 704.

The control system 7 also includes a first display controller 76 for supplying front scene image data from the display data memory 75 to the front monitor unit 61 in every 1/60 second, and a second display controller 78 for supplying lower scene image data from the display data memory 77 to the lower monitor unit 62 in every 1/60 second.

As a consequence, when the game player operates the control lever 3 and the body holder 5 from their reference positions, front and lower simulated images displayed on the front and lower monitor units 61, 62 are continuously scrolled laterally and vertically based on the viewpoint and line of sight of the game player that are periodically calculated by the CPU 70.

The front and lower simulated images are converted into quasi-three-dimensional images that are displayed on the front and lower monitor units 61, 62 for the game player to view various objects and obstacles three-dimensionally in a realistic manner as the simulated hang glider ascends, descends, and turns and also as the objects and obstacles change their orientation by themselves. Furthermore, inasmuch as the simulated images are scrolled, the display data memories 75, 77 may be of a relatively small storage capacity for storing successive image data to be displayed at high speed.

Scrolling of simulated images displayed on the front and lower monitor units 61, 62 in response to control actions of the control lever 3 and the body holder 5 will be described below. When the game player pushes the control lever 3 forwardly, the game player is lifted in the simulated flight, so that the front simulated image displayed on the front monitor unit 61 is scrolled downwardly and the lower simulated image displayed on the lower monitor unit 62 becomes smaller. Conversely, when the game player pulls the control lever 3 rearwardly, the game player is lowered in the simulated flight, so that the front simulated image displayed on the front monitor unit 61 is scrolled upwardly and the lower simulated image displayed on the lower monitor unit 62 becomes greater.

When the game player moves the body holder 5 to the right, the game player turns to the left in the simulated flight, so that the front simulated image displayed on the front monitor unit 61 is scrolled to the right and the lower simulated image displayed on the lower monitor unit 62 is also scrolled to the right without changes in size. Conversely, when the game player moves the body holder 5 to the left, the game player turns to the right in the simulated flight, so that the front simulated image displayed on the front monitor unit 61 is scrolled to the left and the lower simulated image displayed on the lower monitor unit 62 is also scrolled to the left without changes in size.

When the game player moves the control lever 3 and the body holder 5 simultaneously, the front and lower simulated images displayed respectively on the front and lower monitor units 61, 62 except the hang glider are scrolled obliquely to the horizontally and vertical axes of the front and lower monitor units 61, 62.

An operation sequence of the control system 7 for deciding whether the hang glider contacts or hits an obstacle or not will be described below with reference to FIG. 7.

A block PB of the polygonal terrain shape PT which corresponds in an X-Z plane to a certain point P (having coordinates $P_x$, $P_y$, $P_z$) on the hang glider H, e.g., the waist of the displayed pilot on the hang glider H, i.e., a block PB positioned directly below the point P, is identified in a step S1. The position directly below the point P can be identified by quotients produced by dividing the coordinates $P_x$, $P_z$ of the point P in the X-Z plane by the length 4096 of each side of the block PB. The position of the point P is always detected by the control system 7 depending on control actions made by the game player through the control lever 3, etc.

Figure 8:
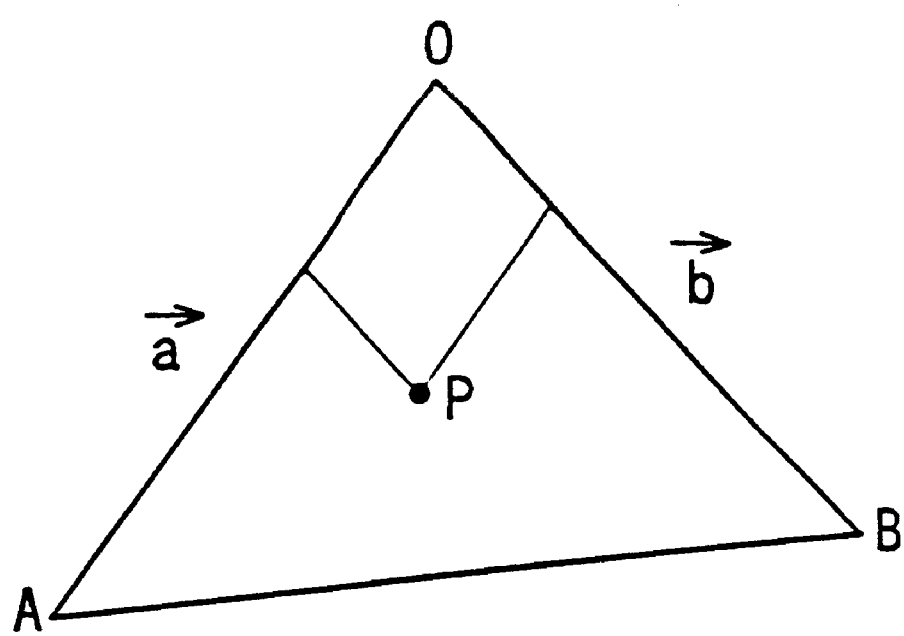
FIG. 8 is a diagram illustrative of the positional relationship between a particular point on the hang glider and a polygon which comprises a triangular shape.

Then, one of the polygons PL disposed in the block PB identified in the step S1, which polygon PL corresponds in the X-Z plane to the point P, i.e., a polygon PL positioned directly below the point P, is identified in a step S2. Specifically, such a polygon PL can be identified as follows: As shown in FIG. 8, it is assumed that a polygon PL is a triangle ΔOAB. If a vector directed from a reference vertex O to the point P is represented by p, a vector directed from the reference vertex O to a vertex A is represented by a, and a vector directed from the reference vertex O to a vertex B is represented by b, then the vector p is expressed by p=(s×a)+(t×b) where s, t are respective coefficients of the vectors a, b. The point P exists on the periphery of or within the triangle ΔOAB if the three conditions s≧0, t≧0, and s+t≦3 are satisfied. Therefore, a polygon which satisfies the above three conditions is given as the polygon PL.

The coefficients s, t are represented by the following equations:

$$s = \frac{b_x \times P_z - P_x \times b_z}{b_x \times a_z - a_x \times b_z} \quad (1)$$

$$t = \frac{a_z \times P_x - P_z \times a_x}{b_x \times a_z - a_x \times b_z} \quad (2)$$

where $a_x$ is a component of the vector a along the X-axis, $a_z$ a component of the vector a along the Z-axis, $b_x$ a component of the vector b along the X-axis, and $b_z$ a component of the vector b along the Z-axis.

The above three conditions are satisfied if SIGN (1)× SIGN (2)≧0, SIGN (3)×SIGN (4)≧0, and ABS (1+3)≦ABS (2) are satisfied where SIGN (1) represents the sign (positive or negative) of the numerator of the equation (1), SIGN (2) represents the sign (positive or negative) of the denominator of the equation (1), SIGN (3) represents the sign (positive or negative) of the numerator of the equation (2), SIGN (4) represents the sign (positive or negative) of the denominator of the equation (2), ABS (1+3) represents the absolute value of the sum of the numerator of the equation (1) and the numerator of the equation (2), and ABS (2) represents the absolute value of the denominator of the equation (1).

Thereafter, a distance y between the point P and the plane of the identified polygon PL is calculated from a vector n normal to the identified polygon PL and the reference vertex O of the triangle ΔOAB in step S3. Specifically, if the normal vector n is represented by components ($n_x$, $n_y$, $n_z$) respectively along the X-, Y-, and Z-axes, and the reference vertex O by components ($O_x$, $O_y$, $O_z$) respectively along the X-, Y-, and Z-axes, then the distance y can be determined according to the equation: $y=n_x(P_x-O_x)+n_y(P_y-O_y)+n_z(P_z-O_z)$. The normal vector n may be stored with respect to each of the polygons in a table, or may be determined from the coordinates of the vertexes of the triangle ΔOAB. In the above equation, any arbitrary point on a plane which contains the polygon PL may be used in place of the reference vertex O. The above steps S1, S2, S3 are executed by the polygon calculator 704.

Thereafter, it is determined whether the distance y determined in the step S3 is negative or not in a step S4. If the distance y is negative, then it is decided that the point P, i.e., the hang glider H, has contacted or hit an obstacle, and a hit signal is issued in a step S5. If the distance y is not negative, then it is decided that the hang glider H has not contacted or hit an obstacle, and a non-hit signal is issued in a step S6. If a hit signal is issued, images are automatically displayed to land or bounce the hang glider H irrespective of control actions made by the game player through the control lever 3, etc. If a non-hit signal is issued, the hang glider H is controlled according to control actions made by the game player through the control lever 3, etc. The steps S4, S5, S6 are executed out by the data decision unit 706.

The game player may continuously control the control lever 3, etc. to lower the hang glider H regardless of a hit signal that is being issued. In this case, the position of the hang glider H along the Y-axis is incremented by the downward displacement detected by the angular displacement sensor 44 for thereby preventing the hang glider H from falling beyond the polygons.

Instead of calculating the distance y in the step S3, it may be decided whether the hang glider H has contacted or hit an obstacle according to the following process: Since the plane of the triangle ΔOAB as the polygon PL is expressed by the equation: ax+by+cz=d, the coordinates $P_x$, $P_z$ of the point P are substituted in x, y of the above equation to calculate the value of y on the plane of the triangle ΔOAB. If the coordinate $P_y$ of the point P is the same as the calculated value of y on the plane of the triangle ΔOAB, then it is decided that the hang glider H has contacted or hit an obstacle. If the difference $P_y-y$ is positive, then it is decided that the hang glider H has not contacted or hit an obstacle. Inasmuch as calculating the value of y on the plane of the triangle ΔOAB is essentially equivalent to calculating the distance y (=$P_y-y$), calculating the value of y on the plane of the triangle ΔOAB is treated as calculating the distance y.

The polygons PL are not limited to the triangular shape, but may be of any of various other polygonal shapes including a rectangular shape. The particular point P on the hang glider H may not be at the waist of the pilot of the hang glider H, but may be at opposite ends of the wing of the hang glider H, or both at the waist of the pilot of the hang glider H and at opposite ends of the wing of the hang glider H. With the particular point P being established at a plurality of locations, it is possible to decide whether the hang glider H has contacted or hit an obstacle in a manner closer to actual conditions in which hang gliders are manipulated.

The flight simulation game apparatus 1 also displays the shadow of the hang glider H on the display monitor 6 for the game player to see while manipulating the hang glider H.

For displaying the shadow of the hang glider H, the memory 73 also stores associated image data of the coordinates of vertexes of as many polygons as necessary to form the image of the shadow to be projected onto the land and textures to be applied to the polygons, and the memory 74 also stores associated image data of the coordinates of vertexes of as many polygons as necessary to form the image of the shadow to be projected onto the land and textures to be applied to the polygons.

Figure 9:
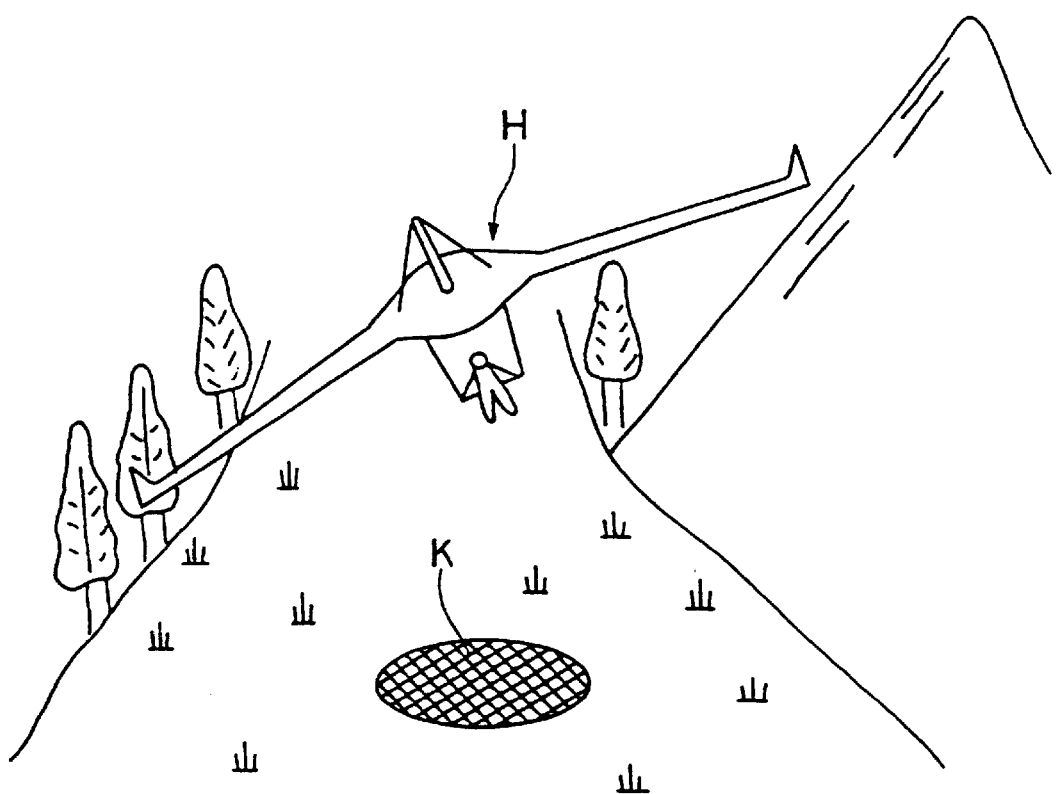
FIG. 9 is a schematic perspective view showing a shadow of a hang glider which is formed on a land displayed in the pseudo-three-dimensional space on the display monitor screen in the flight simulation video game which is played on the flight simulation game apparatus.

The shadow of the hang glider H is projected onto the land directly below the hang glider H by a light source that is established directly above the hang glider H. The shadow of the hang glider H is displayed in a circular shape for simple image data processing. As described above, the CPU 70 reads image data of the hang glider as operated by the game player from the memory 73, and displays an image of the hang glider, as viewed from a viewpoint immediately behind the hang glider, on the front monitor unit 61. At the same time, the CPU 70 also reads image data of the shadow of the hang glider from the memory 73 or the memory 74, and displays the shadow over the land that is being displayed on the front monitor unit 61 or the lower monitor unit 62. Specifically, while the hang glider H is flying high, the shadow thereof is displayed on the lower monitor unit 62, and when the hang glider H is about to land, the shadow thereof is displayed on the front monitor unit 61. FIG. 9 shows the displayed shadow K of the hang glider H.

The first display controller 76 supplies front scene image data, including the image data of the hang glider and its shadow, from the display data memory 75 to the front monitor unit 61 in every 1/60 second, and the second display controller 78 supplies lower scene image data, including the shadow of the hang glider, from the display data memory 77 to the lower monitor unit 62 in every 1/60 second.

An operation sequence of the control system 7 for forming the shadow of the hang glider on the land will be described below with reference to FIG. 10. As described above, the shadow of the hang glider H is projected onto the land directly below the hang glider H by a light source that is established directly above the hang glider H.

Figure 7:
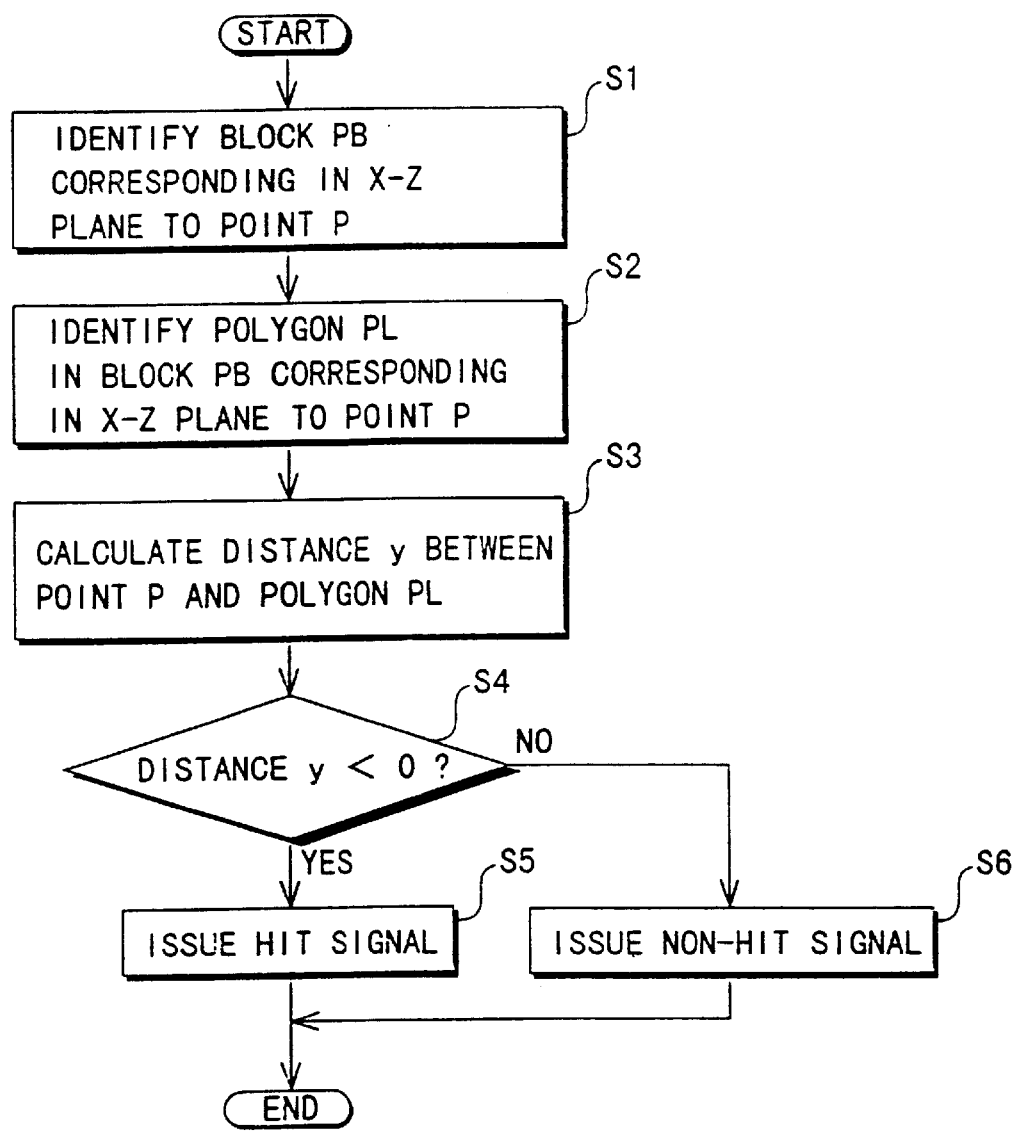
FIG. 7 is a flowchart of an operation sequence of the control system for deciding whether a hang glider, i.e., a moving character, contacts or hits an obstacle, i.e., a fixed character or not.
Figure 10:
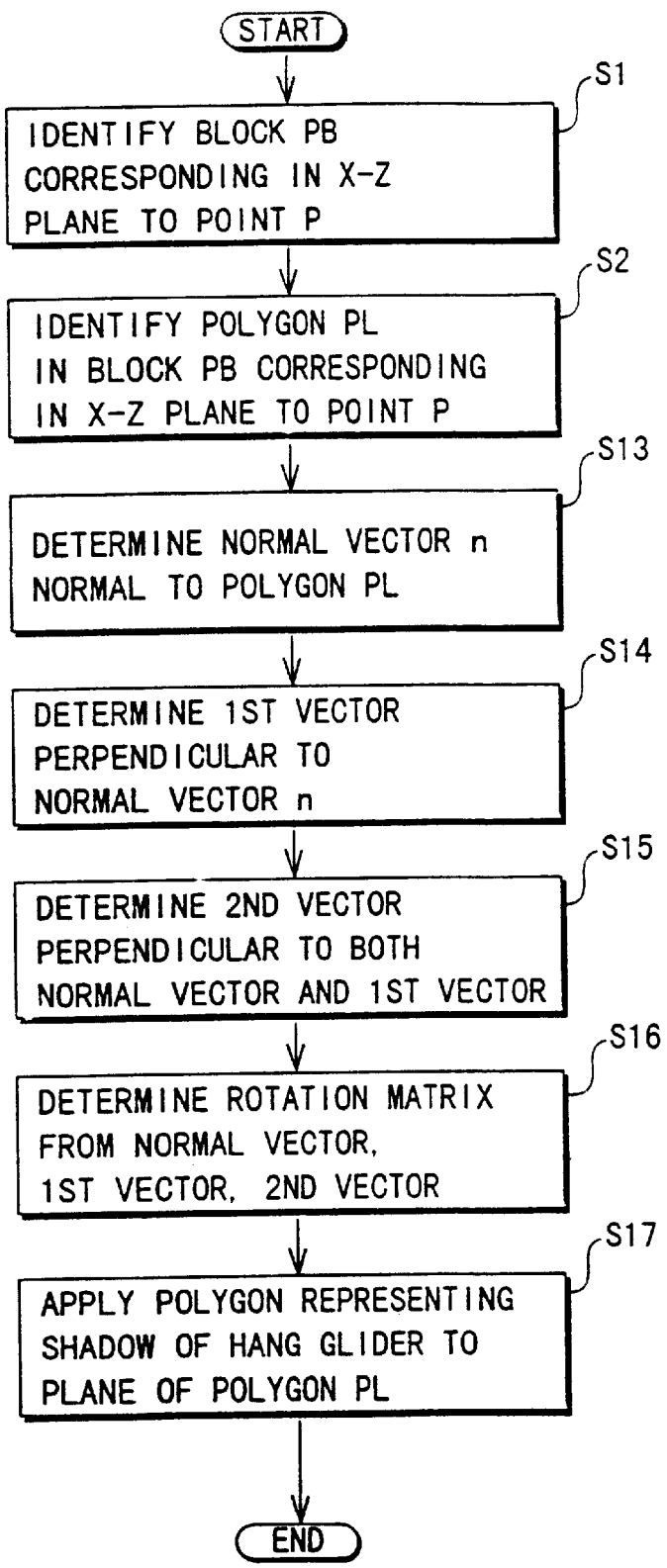
FIG. 10 is a flowchart of an operation sequence of the control system for forming the shadow of the hang glider on the land.

The operation sequence shown in FIG. 10 includes steps S1, S2 which are identical to the steps S1, S2 shown in FIG. 7. Therefore, these steps S1, S2 will not be described in detail below.

Figure 11:
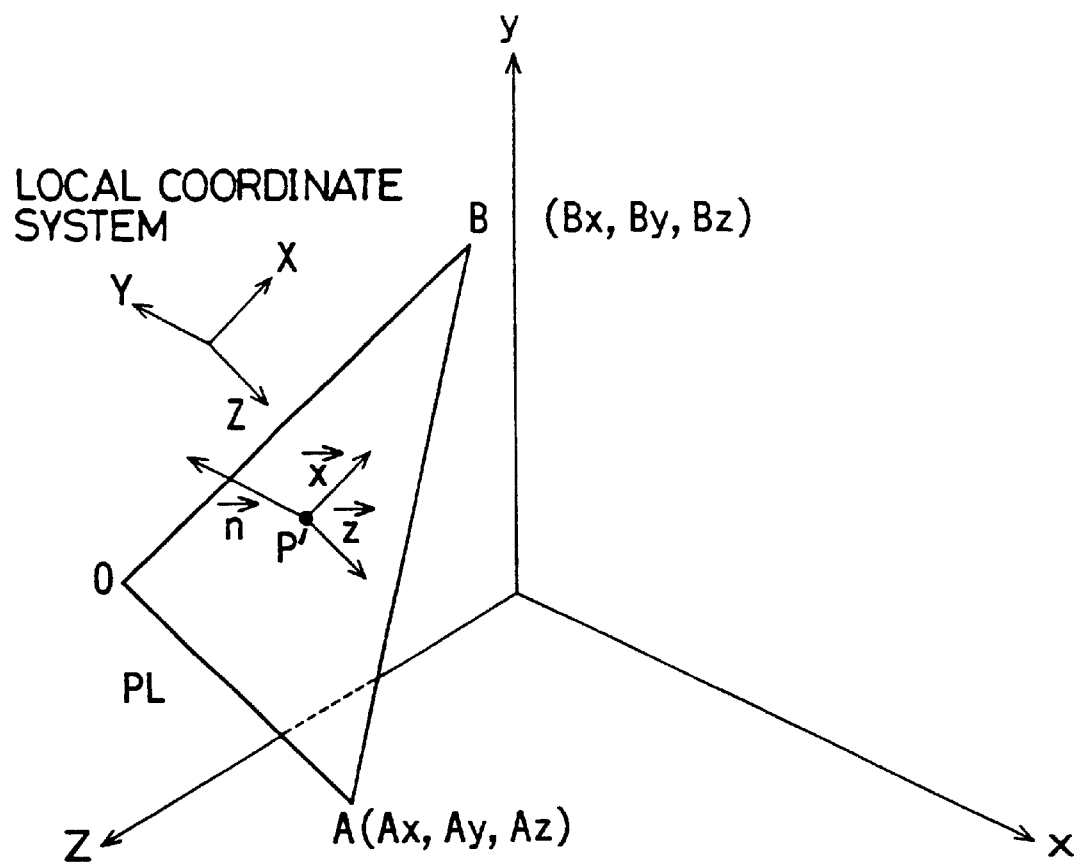
FIG. 11 is a diagram illustrative of a process of determining a normal vector normal to the plane of a polygon established in a local coordinate system, a first vector perpendicular to the normal vector, and a second vector perpendicular to both the normal vector and the first vector.

After the step S2, a vector n normal to the identified polygon PL at the point P is determined in a step S13. Specifically, as shown in FIG. 11, a vector n normal to the triangle ΔOAB as the polygon PL at a point P' is determined from the vertexes of the triangle ΔOAB. The determined normal vector n is represented by coordinates $(n_x, n_y, n_z)$. The normal vector n is normalized. The normal vector n may be read from a table which stores normal vectors associated with the respective polygons.

Then, as shown in FIG. 11, a local coordinate system having X-, Y-, Z-axes with the determined normal vector n extending along the vertical local coordinate axis (Y-axis) are established, and a first vector perpendicular to the normal vector n along the Y-axis is determined in a step S14. The first vector may extend along the X-axis, for example, of the local coordinate system. Since shadow of the hang glider H is of a circular shape which is not affected by rotation about the Y-axis, if it is assumed that the first vector along the X-axis is represented by $X=(X_x, X_y, X_z)$ and two vertexes A, B of the triangle ΔOAB are represented respectively by $A=(A_x, A_y, A_z)$ and $B=(B_x, B_y, B_z)$, then the first vector X can be determined as $X_x=B_x-A_x$, $X_y=B_y-A_y$, $X_z=B_z-A_z$. The first vector X is also normalized. The first vector X may also be determined from two arbitrary points $(A_x, A_y, A_z)$, $(B_x, B_y, B_z)$ on a plane which contains the polygon PL, instead of the two vertexes A, B.

Thereafter, a second vector perpendicular to both the normal vector n and the first vector X is determined in a step S15. The second vector may extend along the Z-axis, for example, of the local coordinate system. The second vector may be determined from the outer product of the normal vector n and the first vector X. Specifically, if the second vector is represented by $Z=(Z_x, Z_y, Z_z)$, then it may be determined as $Z_x=X_y\times n_z-X_z\times n_y$, $Z_y=X_z\times n_x-X_x\times n_z$, $Z_z=X_x\times n_y-X_y\times n_x$. The second vector Z is also normalized.

Then, a rotation matrix which represents a rotation toward an arbitrary plane is determined from the normal vector n, the first vector X, and the second vector Z in a step S16. Specifically, the rotation matrix can be produced as a matrix which is composed of the above three vectors as follows:

$$\begin{bmatrix} X_x & n_x & Z_x \\ X_y & n_y & Z_y \\ X_z & n_z & Z_z \end{bmatrix} \quad (3)$$

Finally, using the above rotation matrix, polygons which form the shadow of the hang glider H are applied to the plane of the polygon PL in a step S17. Specifically, the image data of the vertexes of the polygons which form the shadow of the hang glider H are read from the memory 73 or the memory 74, and the polygons which form the shadow of the hang glider H are displayed over the plane of the polygon PL using the rotation matrix. The shadow of the hang glider H is displayed in preference to the polygon data which are displayed together with shade data over the plane of the polygon PL. If the shadow of the hang glider H is of a semitransparent texture, then the terrain shape positioned beneath the shadow can be seen. The steps S1, S2, S13~S16 are executed by the polygon calculator 704, and the step S17 is executed by the image processor 705.

While the shadow of the hang glider H has been described as being of a circular shape, it may be of any of various other shapes, e.g., a shape similar to the shape of the hang glider H.

In the above embodiment, the polygons which form the shadow of the hang glider H that is a moving character are applied to the plane of the polygon that is a fixed character. However, the polygons applied to the plane of the polygon that is a fixed character are not limited to the shadow of a moving character, but may represent a mark related to the moving character.

The polygons applied to the plane of the polygon that is a fixed character may also represent a mark related to the fixed character, e.g., bullet marks produced by machine-gunning or a hole formed in the land by bombing. The polygon to which the polygons that form a shadow or a mark are applied is not limited to the terrain shape, but may represent a fixed character other than the terrain shape or a moving character.

The present invention has been described and illustrated as being incorporated in the flight simulation game apparatus 1. However, the principles of the present invention are also applicable to various simulators including training apparatus, simulation game apparatus, and other simulation apparatus.

Although certain preferred embodiments of the present invention have been shown and described in detail, it should be understood that various changes and modifications may be made therein without departing from the scope of the appended claims.

What is claimed is:

1. A method of calculating a distance between a moving character displayed in a pseudo-three-dimensional space on a display monitor screen and a fixed character comprising blocks, each of said blocks being comprised of triangular polygons displayed in the pseudo-three-dimensional space on the display monitor screen, comprising the steps of:

identifying a one of said blocks which confronts said moving character;

identifying a one of said triangular polygons containing a point of planar coordinates representing the position of the moving character from among ones of said triangular polygons forming said one of said blocks, including the sub-steps of:

identifying a triangular polygon which satisfies the conditions of:
   $s \geq 0$
   $t \geq 0$ and
   $s+t \leq 1$ in a mathematical expression
   $p = (s \times a) + (t \times b)$
   where:
   p represents a vector directed from a reference vertex of the triangular polygon toward said point of planar coordinates contained in said polygon,
   a and b represent respective vectors directed from a reference vertex of the triangular polygon toward respective other vertexes of the triangular polygon, and
   s and t represent respective coefficients of the vectors a and b; and calculating a distance between said moving character and the triangular polygon which has been identified.

2. A method according to claim 1, wherein said step of calculating a distance comprises the step of calculating a distance y between said moving character and the polygon which has been identified, according to the equation:

$$y = n_x(P_x - O_x) + n_y(P_y - O_y) + n_z(P_z - O_z)$$

where $n_x$, $n_y$, and $n_z$ represent components respectively along X-, Y-, and Z-axes of a vector n normal to the triangular polygon, $P_x$, $P_y$, $P_z$ represent coordinates respectively along the X-, Y-, and Z-axes of the position of the moving character, and $O_x$, $O_y$, $O_z$ represent coordinates respectively along the X-, Y-, and Z-axes of a predetermined point O on a plane which contains said triangular polygon.

3. A method according to claim 2, wherein said predetermined point O comprises a reference vertex of said triangular polygon.

4. An apparatus for calculating a distance between a moving character displayed in a pseudo-three-dimensional space on a display monitor screen and a fixed character comprising blocks, each of said blocks being comprised of polygons displayed in the pseudo-three-dimensional space on the display monitor screen, comprising:

first means for identifying a one of said blocks which confronts said moving character;

second means for identifying a polygon containing a point of planar coordinates representing the position of the moving character from among ones of said polygons forming said one of said blocks, said polygon being of a triangular shape, and said second means comprising means for identifying a polygon which satisfies the conditions of $s \geq 0$, $t \geq 0$, and $s+t \leq 1$ in the equation:

$$p = (s \times a) + (t \times b)$$

where:
   p represents a vector directed from a reference vertex of the polygon toward said point of planar coordinates contained in said polygon,
   a, b represent respective vectors directed from said reference vertex of the polygon toward respective other vertexes of the polygon, and
   s, t represent respective coefficients of the vectors a, b; and third means for calculating a distance between said moving character and the polygon which has been identified by said second means.

5. An apparatus for calculating a distance between a moving character displayed in a pseudo-three-dimensional space on a display monitor screen and a fixed character comprising blocks, each of said blocks being comprised of polygons displayed in the pseudo-three-dimensional space on the display monitor screen, comprising:

first means for identifying a one of said blocks which confronts said moving character;

second means for identifying a polygon containing a point of planar coordinates representing the position of the moving character from among ones of said polygons forming said one of said blocks; and third means for calculating a distance between said moving character and the polygon which has been identified by said second means, said third means comprising means for calculating a distance y between said moving character and the polygon which has been identified, according to the equation:

$$y = n_x(P_x - O_x) + n_y(P_y - O_y) + n_z(P_z - O_z)$$

where:
   $n_x$, $n_y$, $n_z$ represent components respectively along X-, Y-, and Z-axes of a vector n normal to the polygon,
   $P_x$, $P_y$, $P_z$ represent coordinates respectively along the X-, Y-, and Z-axes of the position of the moving character, and
   $O_x$, $O_y$, $O_z$ represent coordinates respectively along the X-, Y-, and Z-axes of a predetermined point O on a plane which contains said polygon.

6. A simulator comprising:

a display monitor for displaying a moving character and a fixed character comprising blocks, each of said blocks being comprised of polygons in a pseudo-three-dimensional space on a display monitor screen;

a control device manipulatable by a player;

detecting means for detecting a control action produced by said control device;

calculating means for calculating a position on the display monitor screen of the moving character based on a detected signal from said detecting means; and an apparatus for calculating a distance between the moving character and the fixed character, said apparatus comprising:

first means for identifying a one of said blocks which confronts said moving character;

second means for identifying a polygon containing a point of planar coordinates representing the position of the moving character calculated by said calculating means from among ones of said polygons forming said one of said blocks, said polygon being of a triangular shape, and said second means comprising means for identifying a polygon which satisfies the conditions of $s \geq 0$, $t \geq 0$, and $s+t \leq 1$ in the equation:

$$p=(s \times a)+(t \times b)$$

where:
p represents a vector directed from a reference vertex of the polygon toward said point of planar coordinates contained in said polygon,
a, b represent respective vectors directed from said reference vertex of the polygon toward respective other vertexes of the polygon, and
s, t represent respective coefficients of the vectors a, b; and third means for calculating a distance between said moving character and the polygon which has been identified by said second means.

7. A simulator according to claim 6, wherein said moving character comprises a flight object, and said control unit comprises means for varying a height of said flight object in the pseudo-three-dimensional space of the display monitor screen.

8. A method of calculating a distance between a character movably displayed in a pseudo-three-dimensional space on a display monitor screen and a polygon model composed of a plurality of polygons displayed in the pseudo-three-dimensional space on the display monitor screen, comprising the steps of:

establishing a hypothetical plane in the pseudo-three-dimensional space and identifying one of the polygons which is positioned on the periphery of or within a polygonal shape onto which said character is projected when said character and the polygons of the polygon model are projected onto said hypothetical plane, said one of the polygons being of a triangular shape, and said step of identifying including identifying a polygon which satisfies the conditions of $s \geq 0$, $t \geq 0$, and $s+t \leq 1$ in the equation:

$$p=(s \times a)+(t \times b)$$

where:
p represents a vector directed from a reference vertex of the polygon toward said point of planar coordinates contained in said polygon,
a, b represent respective vectors directed from said reference vertex of the polygon toward respective other vertexes of the polygon, and
s, t represent respective coefficients of the vectors a, b; and calculating a distance between the identified one of the polygons and said character.

9. An apparatus for calculating a distance between a character movable displayed in a pseudo-three-dimensional space on a display monitor screen and a polygon model composed of a plurality of polygons displayed in the pseudo-three-dimensional space on the display monitor screen, comprising:

polygon identifying means for establishing a hypothetical plane in the pseudo-three-dimensional space and identifying one of the polygons which is positioned on the periphery of or within a polygonal shape onto which said character is projected when said character and the polygons of the polygon model are projected onto said hypothetical plane; and distance calculating means for calculating a distance between said one of the polygons which has been identified by said polygon identifying means and said character, said one of the polygons being of a triangular shape, and said polygon identifying means comprising means for identifying a polygon which satisfies the conditions of $s \geq 0$, $t \geq 0$, and $s+t \leq 1$ in the equation:

$$p=(s \times a)+(t \times b)$$

where:
p represents a vector directed from a reference vertex of the polygon toward said point of planar coordinates contained in said one of the polygons,
a, b represent respective vectors directed from said reference vertex of the polygon toward respective other vertexes of said one of the polygons, and
s, t represent respective coefficients of the vectors a, b.

10. A simulator comprising:

a display monitor visually observable by a player;

display control means for displaying on said display monitor a character movably in a pseudo-three-dimensional space and a polygon model composed of a plurality of polygons in the pseudo-three-dimensional space, as viewed from a predetermined viewpoint;

a control device manipulatable by the player;

detecting means for detecting a control action produced by said control device;

calculating means for calculating a position on the display monitor screen of the moving character based on a detected signal from said detecting means; and an apparatus for calculating a distance between the character and the polygon model;

said apparatus comprising:
polygon identifying means for establishing a hypothetical plane in the pseudo-three-dimensional space and identifying one of the polygons which is positioned on the periphery of or within a polygonal shape onto which said character is projected when said character and the polygons of the polygon model are projected onto said hypothetical plane, said one of the polygons being of a triangular shape, and said polygon identifying means comprising means for identifying a polygon which satisfies the conditions of $s \geq 0$, $t \geq 0$, and $s+t \leq 1$ in the equation:

$$p=(s \times a)+(t \times b)$$

where:
p represents a vector directed from a reference vertex of the polygon toward said point of planar coordinates contained in said one of the polygons,
a, b represent respective vectors directed from said reference vertex of the polygon toward respective other vertexes of said one of the polygons, and
s, t represent respective coefficients of the vectors a, b;

distance calculating means for calculating a distance between said one of the polygons which has been identified by said polygon identifying means and said character; and contact decision means for deciding whether said character and said polygon model has contacted each other based on the distance calculated by said distance calculating means.

11. A simulator according to claim 10, wherein said display control means comprises means for displaying a contact-indicating image on said display monitor when said character and said polygon model has contacted each other as decided by said contact decision means.

12. A method of calculating a distance between a moving character displayed in a pseudo-three-dimensional space on a display monitor screen and a fixed character comprising blocks, each of said blocks being comprised of triangular polygons displayed in the pseudo-three-dimensional space on the display monitor screen, comprising the steps of:

identifying a one of said blocks which confronts said moving character;

identifying a one of said triangular polygons containing a point of planar coordinates representing the position of the moving character in X-Z coordinate character from among ones of said triangular polygons forming said one of said blocks, including the sub-steps of:

identifying a triangular polygon which satisfies the conditions of:

SIGN(1)×SIGN(2) $\geqq$ 0
SIGN(3)×SIGN(4) $\geqq$ 0
ABS(1+3) $\leqq$ ABS(2)

$$s = \frac{b_x \times P_z - P_x \times b_z}{b_x \times a_z - a_x \times b_z} \quad (1)$$

$$t = \frac{a_z \times P_x - P_z \times a_x}{b_x \times a_z - a_x \times b_z} \quad (2)$$

where:
SIGN (1) represents the sign (positive or negative) of the numerator of equation (1),
SIGN (2) represents the sign (positive or negative) of the denominator of the equation (1),
SIGN (3) represents the sign (positive or negative) of the numerator of equation (2),
SIGN (4) represents the sign (positive or negative) of the denominator of the equation (2),
ABS (1+3) represents the absolute value of the sum of the numerator of the equation (1) and the numerator of the equation (2),
ABS (2) represents the absolute value of the denominator of the equation (1),
$P_x$ represents an X-coordinate of a point P at a certain point of the moving character,
$P_z$ represents a Z-coordinate of the point P of the moving character,
a and b represent respective vectors directed from a reference vertex of the triangular polygon toward respective other vertexes of the triangular polygon,
$a_x$ is a component of a vector a along the X-axis,
$a_z$ is a component of the vector a along the Z-axis,
$b_x$ is a component of a vector b along the X-axis, and
$b_z$ is a component of the vector b along the Z-axis; and calculating a distance between said moving character and the triangular polygon which has been identified.

* * * * *